United States Patent [19]

Diefenthaler, Jr.

[11] Patent Number: 4,531,379
[45] Date of Patent: Jul. 30, 1985

[54] AUXILIARY POWER SYSTEM FOR VEHICLE AIR CONDITIONER AND HEATER

[76] Inventor: Robert E. Diefenthaler, Jr., 4195 3rd Ave., NW., Naples, Fla. 33999

[21] Appl. No.: 541,982

[22] Filed: Oct. 14, 1983

[51] Int. Cl.³ .................. F25B 27/00; B60H 3/04; F01P 7/10

[52] U.S. Cl. .................. 62/236; 62/243; 62/323.1; 236/35.3; 237/12.3 B; 165/43; 60/714; 123/41.06; 123/DIG. 8

[58] Field of Search ........... 62/236, 243, 244, 323.1, 62/323.4; 60/313, 320, 714; 123/41.15, 341, 41.04, 41.05, 41.06, DIG. 8; 165/43; 180/309, 69.6, 89.2, 68.1; 236/35.2, 35.3; 237/12.3 B, 12.3 C

[56] References Cited

U.S. PATENT DOCUMENTS

| | | |
|---|---|---|
| 1,992,568 | 2/1935 | Connor . |
| 2,039,240 | 4/1936 | Frese . |
| 2,053,206 | 9/1936 | Sargent . |
| 2,106,515 | 1/1938 | Wanamaker . |
| 2,231,069 | 2/1941 | Harris . |
| 2,251,376 | 8/1941 | Ross . |
| 2,273,281 | 2/1942 | McGrath . |
| 2,569,009 | 9/1951 | Kuempel . |
| 2,699,043 | 1/1955 | Kramer . |
| 2,922,290 | 1/1960 | Carraway . |
| 2,932,957 | 4/1960 | Norman . |
| 3,181,308 | 5/1965 | Vander Hagen . |
| 3,218,821 | 11/1965 | Spatt . |
| 3,381,316 | 5/1968 | Anderson . |
| 3,447,624 | 6/1969 | Balan et al. ............ 123/341 X |
| 3,512,373 | 5/1970 | White . |
| 3,521,704 | 7/1970 | Bridegum . |
| 3,545,222 | 12/1970 | Petranek . |
| 3,585,812 | 6/1971 | Parker . |
| 3,646,773 | 3/1972 | Falk et al. . |
| 3,841,108 | 10/1974 | Pierrat . |
| 3,844,130 | 10/1974 | Wahnish . |
| 3,868,060 | 2/1975 | Mitchell . |
| 3,877,639 | 4/1975 | Wilson et al. . |
| 3,885,398 | 5/1975 | Dawkins . |
| 3,889,879 | 6/1975 | Wellman et al. . |
| 3,984,224 | 10/1976 | Dawkins . |
| 4,217,764 | 8/1980 | Armbruster . |
| 4,300,720 | 11/1981 | Baier et al. . |
| 4,381,744 | 5/1983 | Terry ............ 123/41.15 X |
| 4,412,509 | 11/1983 | Black ............ 60/320 X |
| 4,424,775 | 1/1984 | Mayfield, Jr. et al. . |

FOREIGN PATENT DOCUMENTS

| | | | |
|---|---|---|---|
| 687106 | 1/1919 | Fed. Rep. of Germany ........ 60/313 |
| 833256 | 7/1938 | France ............ 60/313 |
| 0046011 | 3/1982 | Japan ............ 60/313 |

Primary Examiner—Harry Tanner
Attorney, Agent, or Firm—Willian Brinks Olds Hofer Gilson & Lione Ltd.

[57] ABSTRACT

An auxiliary power system for an air conditioner and heater of a vehicle includes an auxiliary motor which is selectively connected by an electromagnetic clutch of a jack shaft assembly to drive the compressor of the vehicle's air conditioner. The jack shaft assembly reduces the RPM of the auxiliary motor to an RPM suitable for operating the compressor. The auxiliary engine has a cooling system and an exhaust system which are respectively connected to the cooling and exhaust systems of the vehicle's main engine. A baffle plate is provided at the point of connection to direct the flow of exhaust gases from the auxiliary engine into the exhaust system of the main engine. Solenoid actuated valves circulate coolant fluid from either the auxiliary or main engine to selectively heat water in a tank or to heat the interior of the passenger compartment of the vehicle. An auxiliary fan cools the condenser and radiator of the vehicle when the auxiliary engine is operating. Shroud doors are closed to direct the flow of air from the auxiliary fan when the main engine is not operating and are opened to bypass the auxiliary fan when the main engine is operating. The operational RPM of the auxiliary engine is maintained by a vacuum-actuated bellows which is spring-biased to control the movement of the throttle of the engine's carburetor.

20 Claims, 9 Drawing Figures

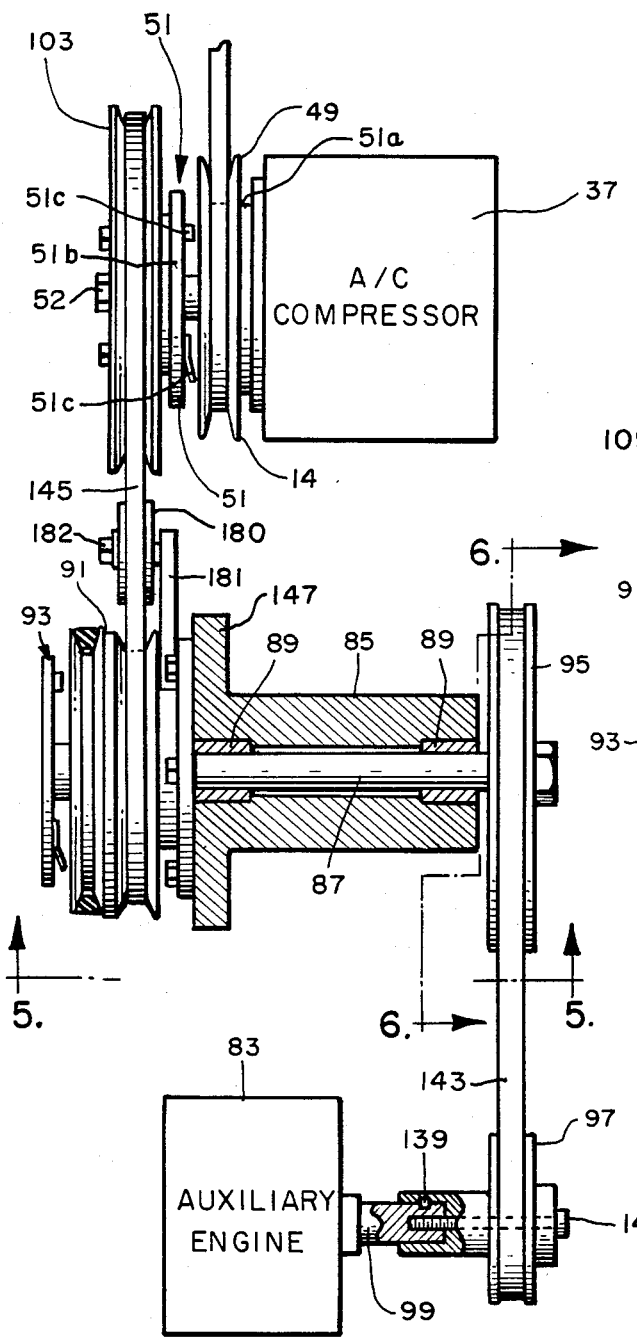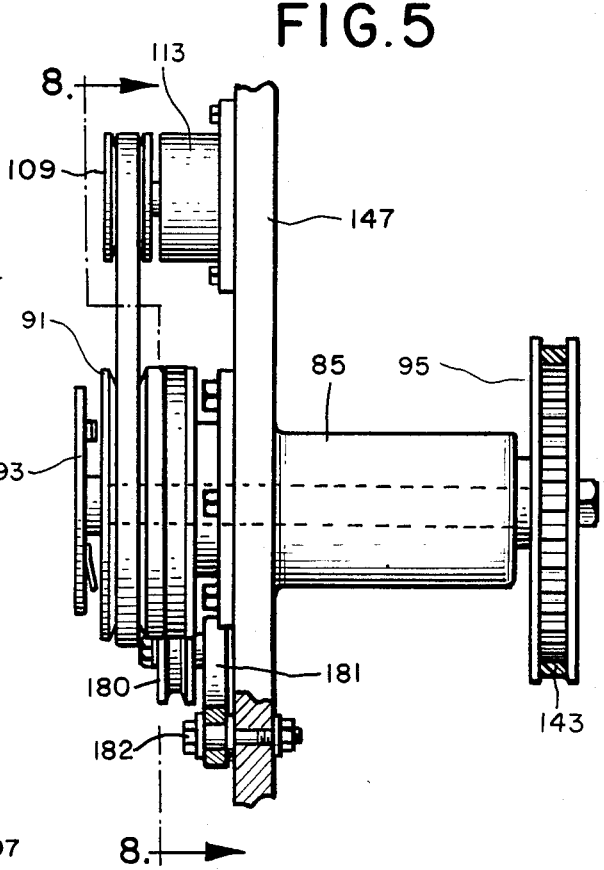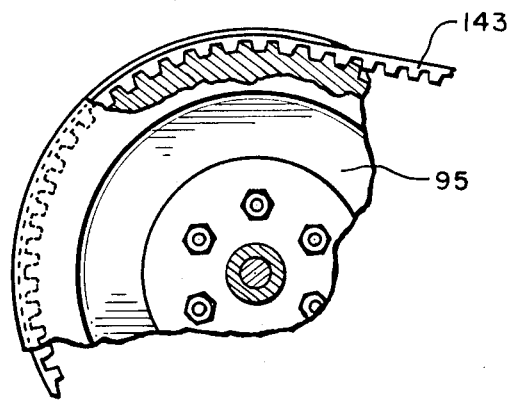

AUXILIARY POWER SYSTEM FOR VEHICLE AIR CONDITIONER AND HEATER

TECHNICAL FIELD

The invention relates to a system for powering the air conditioner and heater of a vehicle, for example an automobile or a van. More particularly, the invention is directed to an auxiliary power system which operates the air conditioner or heater of a vehicle when the vehicle's engine is not operating.

BACKGROUND OF THE INVENTION

A motor vehicle such as an automobile or a van typically includes air conditioning apparatus which cools the passenger compartment of the vehicle when its engine is running. Such vehicle air conditioners typically employ a standard refrigeration cycle in which a refrigerant such as Freon is passed between gaseous and liquid states for purposes of cooling. In known air conditioning systems, an air conditioning compressor is driven by a pulley and belt connection with the vehicle's engine. The compressor circulates refrigerant through a condenser, an expansion valve and an evaporator. The expansion valve substantially reduces the pressure and temperature of liquid refrigerant which is supplied by the condenser and the evaporator converts the liquid of the expansion valve to a vapor of relatively low pressure and temperature. The vapor is then passed to the compressor for circulation to the condenser. A blower fan operates with the evaporator to provide cool air for the passenger area of the vehicle.

In order to provide a viable air conditioning system, the engine of the vehicle must be sufficiently powerful to move the vehicle and to provide an additional increment of power sufficient to operate the compressor of the air conditioner. The relatively large power output of the engine is thus effectively used to move the vehicle and to provide a comfortable operating environment for its occupants.

If a vehicle is parked for extended periods, it is often not possible to continue running the engine to maintain a comfortable temperature in the passenger compartment. For example, if the vehicle is stationary, the engine may tend to overheat while operating in relatively high ambient temperatures. Also, the idle setting for the engine may not be sufficiently high to keep both the engine and air conditioning compressor running when the vehicle is parked. Accordingly, it may be necessary to accelerate the engine and thus generate undesirable noise and noxious fumes to maintain operation of the air conditioning system.

Moreover, if the driver leaves the vehicle, the engine must be turned off for safety purposes and also to avoid wasting fuel. When the driver returns, the vehicle will be uncomfortably hot for an extended period during which the air conditioner operates to cool the heated air.

Typical vehicle air conditioning systems also have operational disadvantages in recreational vehicles, such as vans, which have a living compartment. It is often desired to park such vehicles for hours at a time while the living compartment is being used, for example for sleeping. Air conditioning is typically not provided while the van is parked, because operating the engine during such periods is noisy, relatively unsafe and is wasteful of fuel.

Accordingly, it is an object of the invention to provide a relatively simple and reliable auxiliary engine which drives the compressor of a vehicle's air conditioning system and maintains a comfortable temperature within the passenger compartment of the vehicle when its main engine is turned off.

A further object of the invention is to provide such an auxiliary engine which operates by internal combustion and utilizes the cooling and exhaust system of the vehicle's main engine.

Another object of the invention is to provide such an auxiliary engine with a throttle control which automatically maintains a predefined RPM output for operating an air conditioning compressor.

A further object of the invention is to provide such an auxiliary engine with an exhaust system which is connected to the exhaust system of the main engine with a baffle plate which prevents exhaust gases from backing up into the main engine and which directs the gases of the auxiliary engine through a catalytic converter and muffler of the vehicle.

It has been suggested that an auxiliary engine may be provided in a vehicle to operate the vehicle's air conditioner. For example, as disclosed in U.S. Pat. No. 3,844,130, an auxiliary power system can utilize an electrical generator located in the trunk of an automobile to operate an auxiliary electric motor which powers the compressor of an air conditioner. This proposed system has limited practicality for passenger automobiles and recreational vans, because a relatively large amount of space is required to generate the electrical power that operates the auxiliary electric motor. Moreover, the disclosed system is relatively inefficient as a result of energy losses which occur when a mechanical drive system such as an internal combustion engine generates electrical energy which is in turn converted to mechanical energy by an electric motor to drive a compressor.

It is therefore an object of the invention to provide a compact auxiliary internal combustion engine which can be easily installed in the engine compartment of a vehicle to directly drive the compressor of the vehicle's air conditioning system.

A further object of the invention is to provide such an auxiliary engine with a jack shaft which couples power from the engine to the compressor.

Another object of the invention is to provide such a jack shaft apparatus which is geared to convert an optimum RPM output of the auxiliary engine to an optimum RPM driving input for the compressor.

In the system of the U.S. Pat. No. 3,844,130, an auxiliary fan is provided to cool the radiator and condenser of the air conditioner when the auxiliary power system is operating. However, cooling is not optimized, because the fan directs its flow of air to only a portion of the condenser and radiator. It is therefore desirable to provide a shroud which will direct the air of the auxiliary fan over the entire face of the radiator and condenser and which will not block the flow of air from the fan of the main engine when the auxiliary fan is turned off.

Accordingly, it is an object of the invention to provide a shroud which directs the flow of air from an auxiliary fan over the face of the radiator and condenser of a vehicle when the main engine of the vehicle is not operating.

Another object of the invention is to provide such a shroud which automatically opens to allow air to bypass the auxiliary fan and to flow through the condenser and radiator when the main engine is operating.

Automobiles and other vehicles typically include a heater core and a fan which directs air through the heater core to heat the passenger compartment when the ambient outside temperature is uncomfortably low. The problems of heating a vehicle in this manner with the vehicle's main engine are similar to the problems discussed with repect to operating the compressor of an air conditioning system with the main engine. Thus, it is desirable to provide an auxiliary power system which will heat the passenger compartment of a vehicle, without operating the vehicle's main engine.

Accordingly, it is an object of the invention to provide an internal combustion auxiliary engine which powers the compressor of a vehicle's air conditioner and also includes a water cooling system which provides a flow of high temperature water to a heater core to heat the passenger compartment of the vehicle when the vehicle's main engine is not running.

Recreational vans occasionally carry a water storage tank which is used as a convenient source of water for occupants of the van. Such tanks either do not provide heated water or require a power system external to the van to heat the stored water. It would be desirable in such vans to provide a relatively simple and efficient means within the van for heating water in the tank.

Accordingly, it is a further object of the invention to provide an auxiliary engine which will heat water in a storage tank of a vehicle.

Another object of the invention is to provide a system for automatically controlling valves which connect the water cooling system of a vehicle's auxiliary and main engines to selectively heat a water tank and the passenger compartment of the vehicle.

Although an auxiliary internal combustion engine may be independently designed for the system of the invention, it is advantageous from a manufacturing standpoint to utilize a commercially available engine to provide the functions of the invention. It has been found that a 10 hp marine outboard motor is suitable for powering the compressor of typical vehicle air conditioning systems. Such motors are sufficiently small to satisfy the space requirements of the invention and have sufficient power to achieve the objects of the invention.

Accordingly, it is an object of the invention to utilize the power head of a marine outboard motor as an auxiliary power source for operating a vehicle air conditioning and heating system.

It is a further object of the invention to provide a means for modifying the operation of such an outboard engine, so that it can operate in a horizontal rather than a vertical orientation.

These and other objects of the invention will be appreciated by a review of the drawings and of the following detailed description of preferred embodiments.

BRIEF SUMMARY OF THE INVENTION

In order to achieve the objects of the invention and to overcome the problems of the prior art, the auxiliary power system for heating and air conditioning a vehicle includes an auxiliary internal combustion engine, for example a marine outboard motor. A jack shaft apparatus rotatively connects the drive shaft of the auxiliary engine to an air conditioning compressor of the vehicle through an auxiliary clutch assembly. The jack shaft apparatus is geared to reduce the RPM of the auxiliary engine to a preselected RPM for operating the compressor. The main driving engine of the vehicle is also rotatively connected to the air conditioner compressor through a clutch assembly supported on the drive shaft of the compressor.

In operation, the clutch assembly of the jack shaft is disengaged and the clutch assembly of the compressor is engaged to allow the vehicle's main engine to drive the compressor. When the main engine is not running, the clutch assembly of the jack shaft may be engaged to allow the auxiliary engine to drive the compressor.

The main engine includes a radiator through which a coolant fluid is passed to cool both the main and auxiliary engines. A condenser is disposed in front of the radiator and an auxiliary fan is positioned to cool the condenser and radiator when only the auxiliary engine is running. Movable shroud doors are positioned to direct the flow of air from the auxiliary fan to the radiator and condenser when the main engine is off and the auxiliary engine is running. When the auxiliary engine is off and the main engine is running, the shroud doors are automatically opened by a vacuum-actuated bellows assembly, so that air supplied by a main fan bypasses the auxiliary fan to cool the condenser and radiator.

The auxiliary engine includes a carburetor which supplies fuel to the engine at a rate that is automatically maintained by a vacuum-actuated throttle control. The exhaust gases of the auxiliary engine are passed to the exhaust system of the main engine through a pipe with an internal baffle which directs the gases to a catalytic converter and muffler. The baffle prevents the exhaust gases of the auxiliary engine from backing up through the main engine.

In one embodiment of the invention, the cooling system of the main and auxiliary engines is connected to a first heater core within a water tank of the vehicle and a second heater core which may be operated to heat the passenger compartment of the vehicle. Solenoid-actuated valves are provided to circulate coolant fluid from either engine to heat the heater cores.

BRIEF DESCRIPTION OF THE DRAWINGS

FIG. 4 is a plan view in partial section of pulley connections for a vehicle air conditioning compressor, jack shaft and auxiliary engine in the system of the invention.

FIG. 5 is a side elevation view of the jack shaft pulley assembly of FIG. 4, taken along a line 5-5.

FIG. 6 is a partial cutaway view of a Gilmore belt and its associated drive pulley for the jack shaft of FIG. 4.

DETAILED DESCRIPTION OF PREFERRED EMBODIMENTS

Figure 1:
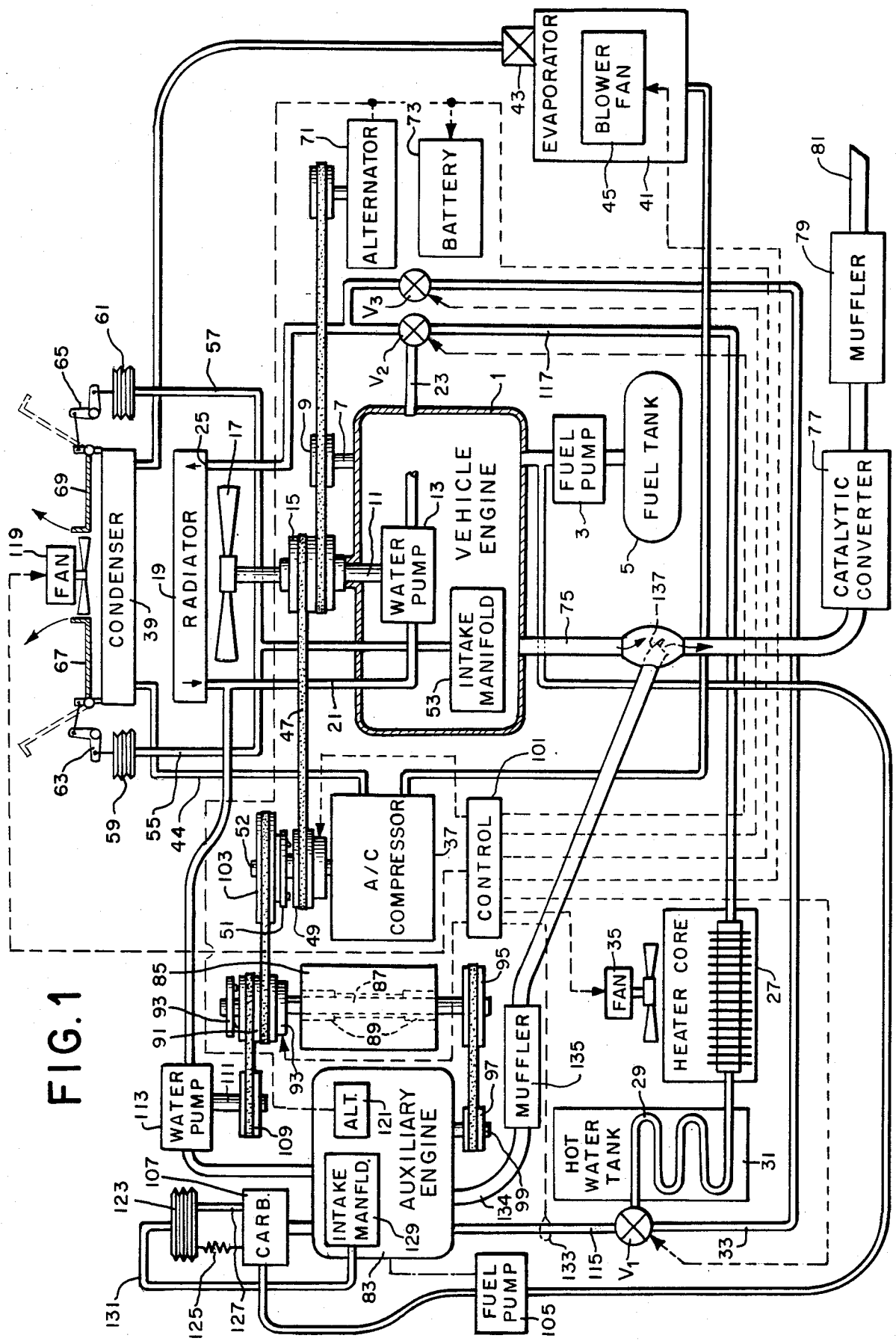
FIG. 1 is a diagrammatic illustration of an auxiliary power system which operates the air conditioning and heating apparatus of a vehicle.

The remaining portion of this specification will describe preferred embodiments of the invention when read in conjunction with the attached drawings, in which like reference characters identify identical apparatus.

FIG. 1 is a diagrammatic illustration of an auxiliary power system for air conditioning and heating a vehicle. As shown in FIG. 1, a main internal combustion engine 1, such as is known in the art, is provided to move a vehicle and power the air conditioning and heating systems of the vehicle. In operation, a fuel pump 3 pumps combustible fuel, for example gasoline, from a fuel tank 5 to operate the engine 1. Reciprocating pistons (not shown) in the engine rotate a crankshaft which is coupled by a transmission to move the vehicle. The crankshaft of the engine also turns a shaft 7 and an associated pulley 9. The pulley 9 rotates a shaft 11 which operates a water pump 13 and in addition rotates the drive pulley 15 of a main fan 17 which provides a flow of cooling air to a radiator 19 and a condenser 39.

The water pump 13 of the engine 1 operates to circulate a coolant fluid, for example water, from an output line 21 of the radiator, through the engine and out of an exhaust line 23. The hot water at the exhaust line 23 is passed through a solenoid-actuated valve V2 which is controlled by a control circuit 101, for example a series of switches, to direct the water either to an input port 25 of the radiator 19 or to a heater core 27. Water passed to the heater core 27 also passes along a heating element 29 of a hot water tank 31, through a solenoid-actuated valve V1 and to a return line 33. The hot radiator water then passes along the return line 33, through an open solenoid-actuated valve V3 and to the input port 25 of the radiator 19. Water or other cooling fluid is thus circulated through the radiator to cool the engine 1 and to heat the heater core 27 and hot water tank 31. If it is desired to heat the passenger compartment of the vehicle, a fan 35 is operated to circulate air through the heater core 27 and into the passenger compartment.

If the valve V2 is operated to pass water directly from the output line 23 of the engine to the input port 25 of the radiator, the valve V3 is closed by the control 101 to block the line 33 and thus prevent water from flowing to the heater core 27 and hot water tank 31.

The air conditioning system of the vehicle includes a compressor 37, the condenser 39, an evaporator 41 and an expansion valve 43. In operation, as is known in the art, the compressor pumps a refrigerant, for example freon, through the line 44 and to the condenser 39 as a relatively high pressure and high temperature vapor. When the engine 1 is operating, cooling air is pulled through the condenser 39 by the fan 17 to condense the vapor to a high pressure, high temperature liquid. The liquid is passed from the condenser 39 to the expansion valve 43 which reduces the pressure and temperature of the liquid. The evaporator 41 then converts the liquid to a low pressure, low temperature vapor which is passed to the compressor 37. The evaporator cools air provided by a blower fan 45 and directs the air into the passenger compartment of the vehicle.

As is known in the art, the air compressor 37 is powered by the drive pulley 15 of the engine 1. In operation, the drive pulley 15 rotates a belt 47 which turns a compressor drive pulley 49 rotatively supported on a drive shaft 52 of the compressor. An electromagnetic clutch assembly 51 is selectively energized by the control 101 to connect the shaft 52 and pulley 49 so that the engine 1 drives the compressor and thus provides the above-described flow of refrigerant to cool the passenger compartment of the vehicle.

While the main engine 1 is running, a vacuum is provided within the intake manifold 53 of the engine. The vacuum is applied by lines 55 and 57 to respective vacuum bellows elements 59 and 61 which are known in the art. The bellows 59 and 61 are biased to expand when a vacuum is not present and to collapse when the vacuum is applied to the lines 55 and 57. Each bellows is connected by a pin to one arm of associated bell cranks 63 and 65. The bell cranks 63 and 65 are in turn connected by pins to ends of shroud doors 67 and 69. When the engine 1 is running, the bellows elements 59 and 61 collapse to hold the bell cranks 63 and 65 in pivotal positions which open the shroud doors 67 and 69, as illustrated with hidden lines. Thus, while the engine 1 operates, the fan 17 draws air through openings exposed by the open doors 67 and 69 to cool the condenser 39 an radiator 19.

As is known in the art, the drive shaft 7 of the engine 1 also operates an alternator 71 which maintains the charge on a battery 73. The battery operates the electrical systems of the vehicle. Also, as is known in the art, exhaust gases from the engine 1 are exhausted through a pipe 75, a catalytic converter 77, a muffler 79 and a tail pipe 81.

An auxiliary internal combustion engine 83 is provided to power the vehicle's air conditioning system and to heat the heater core 27 and hot water tank 31 when the main engine 1 is not operating. The auxiliary engine 83 operates the air conditioner compressor 37 through a jack shaft assembly 85. The jack shaft assembly 85 has a power transfer shaft 87 which is rotatably supported by bearings 89. A dual drive pulley 91 is supported for free rotation on the front of the shaft when an electromagnetic clutch assembly 93 is disengaged. When the clutch assembly 93 is engaged, the shaft 87 is connected to rotate with the drive pulley 91.

A drive pulley 95 is affixed at the opposite end of the shaft 87 for rotation with the shaft. The pulley 95 is driven by a pulley 97 which is rotated by a drive shaft 99 of the auxiliary engine 83.

When the main engine 1 is operating and the air conditioning system is on, the clutch assembly 51 is energized to allow the pulley 15 of the engine 1 to rotate the pulley 49 and the drive shaft 52 of the air conditioning compressor 37. If it is desired to shut down the main engine 1 and to operate the compressor 37 with the auxiliary engine 83, the control circuit 101 energizes the clutch 93 of the jack shaft assembly, so that the drive pulley 91 and power transfer shaft 87 are rotated by a drive pulley 103 which is affixed to the rotating shaft 52 of the compressor 37. The main engine 1 thus rotates the compressor shaft 52 by means of the energized clutch assembly 51 and rotates the shaft 87 by means of the energized clutch 93. The rotating power transfer shaft 87 rotates the shaft 99 of the auxiliary engine through the pulleys 95 and 97. The rotating shaft 99 operates a fuel pump 105 which is mechanically coupled to the engine 83 and thus supplies fuel to the engine. Rotation of the shaft 89 also energizes the ignition system, for example a capacitive discharge system, of the engine 83 and thus turns the engine on. The operating condition of the engine 83 may be signaled by energizing an indicator lamp with the alternator 121.

It should now be understood that the auxiliary engine 83 is started by simultaneously energizing the clutches 51 and 53 while the engine 1 is running. Once the auxiliary engine has started, the clutch assembly 51 is de-energized and the main engine 1 is turned off. Thereafter, the drive shaft 99 of the auxiliary engine turns the pulley 95 and power transfer shaft 87. The shaft 87 in turn rotates the drive pulley 91 through the energized clutch assembly 93. The rotating pulley 91 rotates the pulley 103 and its affixed compressor shaft 52 and thus operates the compressor 37.

The rotating pulley 91 of the power transfer shaft also rotates a pulley 109 which is connected to the drive shaft 111 of a water pump 113. The water pump 113 is thus operated to pump water or other coolant fluid from the output line 21 of the radiator 19 to cool the auxiliary engine. The heated water is discharged from the auxiliary engine through an exhaust line 115 which is connected to the solenoid-actuated valve V1. The valve V1 is operated by the control circuit 101 to pass heated water from the auxiliary engine to either the return line 33 or to the heating element 29 and heater core 27. Heated water passed to the heater 29 and heater core 27 flows through a line 117 and the valve V2 to the input port 25 of the radiator 19. When coolant fluid is passed in this manner, the valve V3 is closed so that the only path for the fluid is through the valve V2 to the radiator 19.

If the valve V1 is operated to bypass the hot water tank 31 and heater core 27, the valve V3 is opened and V2 is closed so that coolant fluid passes along the return line 33 to the input port 25 of the radiator 19.

When the main engine 1 and auxiliary engine 83 are momentarily simultaneously operating at the time that the auxiliary engine is turned on, the valve V1 passes coolant fluid from the auxiliary engine to the line 33, through the open valve V3 and to the radiator port 25. Also, the valve V2 connects the engine line 23 to the input port 25 and blocks the line 117 so that coolant passes from the engine 1 directly to the input port 25.

When the main engine 1 is turned off, the bellows elements 59 and 61 expand to pivot the bell cranks 63 and 65 so that the shroud doors 67 and 69 close to the position shown in FIG. 1. When the auxiliary engine 83 is turned on, an auxiliary fan 119 is also turned on by the control 101 to force cooling air through the condenser 39 and radiator 19. The closed shroud doors 67 and 69 direct the flow of air from the fan 119 against the full face of the condenser 39 and radiator 19 and thus ensure that the refrigerant in the condenser and coolant fluid in the radiator are uniformly cooled. It should be understood that the auxiliary fan 119 is required for cooling, because the fan 17 is turned off when the engine 1 is not operating.

When the engine 83 is operating, the alternator 121 charges the battery 73 and thereby maintains power for the electrical systems of the vehicle.

A relatively constant RPM output for the shaft 99 of the auxiliary engine is maintained by an automatic throttle control assembly for a carburetor 107 of the engine. In operation, a vacuum-controlled bellows 123 is biased to an extended position by a spring 125. The bellows 123 is also connected to operate the throttle of the carburetor 107 through a throttle linkage 127. When the bellows is fully extended, the throttle is operated to provide a maximum flow of fuel to the carburetor so that the engine can be easily started. When the engine 83 is running, a vacuum is provided in an intake manifold 129 of the engine and is applied to a line 131 to collapse the bellows 123. As the bellows collapses, the throttle linkage 127 is moved to decrease the flow of gasoline to the carburetor. When the RPM of the shaft 99 reaches a predetermined value, the vacuum of the intake manifold 129 balances the force of the spring 125 and thus maintains a particular setting for the carburetor 107 which maintains the predetermined RPM for the engine 83.

Although an automatic vacuum-controlled throttle mechanism is disclosed for the embodiment of FIG. 1, other throttle control mechanisms may be used. Thus, for example, a manual control may be provided to adjust the throttle setting of the engine. Alternatively, a governor may be used to control the operating RPM of the engine.

It should also be appreciated that the auxiliary engine of FIG. 1 may be started by means other than a power assist from the main engine 1. Thus, for example, the auxiliary engine could be provided with an electric starter or even a mechanical pull starter, without departing from the invention.

In controlling the starting of the auxiliary engine, a control light may be connected to the output of the alternator 121 to visually indicate when the engine has started and to thus signal the operator that the vehicle engine 1 may be turned off. However, other means may be employed to signal starting of the engine, without departing from the invention. Alternatively, if the auxiliary engine is started by means other than a power assist from the main engine, a visual indicator for operation of the auxiliary engine may not be required.

The auxiliary engine may be provided with a thermal sensor 133 which detects the temperature of the coolant fluid in the exhaust line 115 of the engine. If the detected temperature exceeds a predefined trigger value, for example 220° F. (104.4° C.), the control 101 will automatically turn off the auxiliary motor by grounding its capacitive discharge ignition system. Grounding of the ignition system may be achieved, for example, by using a pointer of a temperature sensing guage to connect a ground circuit when it moves to register a predetermined trigger temperature.

The exhaust gases of the auxiliary engine are passed by a pipe 134 through a muffler 135 to the main exhaust pipe 75 of the vehicle. A baffle plate 137 is provided at the point of connection within the pipe 75, in order to direct the flow of exhaust gases from the auxiliary engine to the catalytic converter 77 and muffler 79. The baffle plate 137 prevents the exhaust gases of the auxiliary engine from backing up into the main engine 1. Moreover, the baffle plate 137 is dimensioned and positioned to allow the exhaust gases of the main engine 1 to move to the tail pipe 81, without backing up into the exhaust system of the auxiliary engine.

Figure 2:
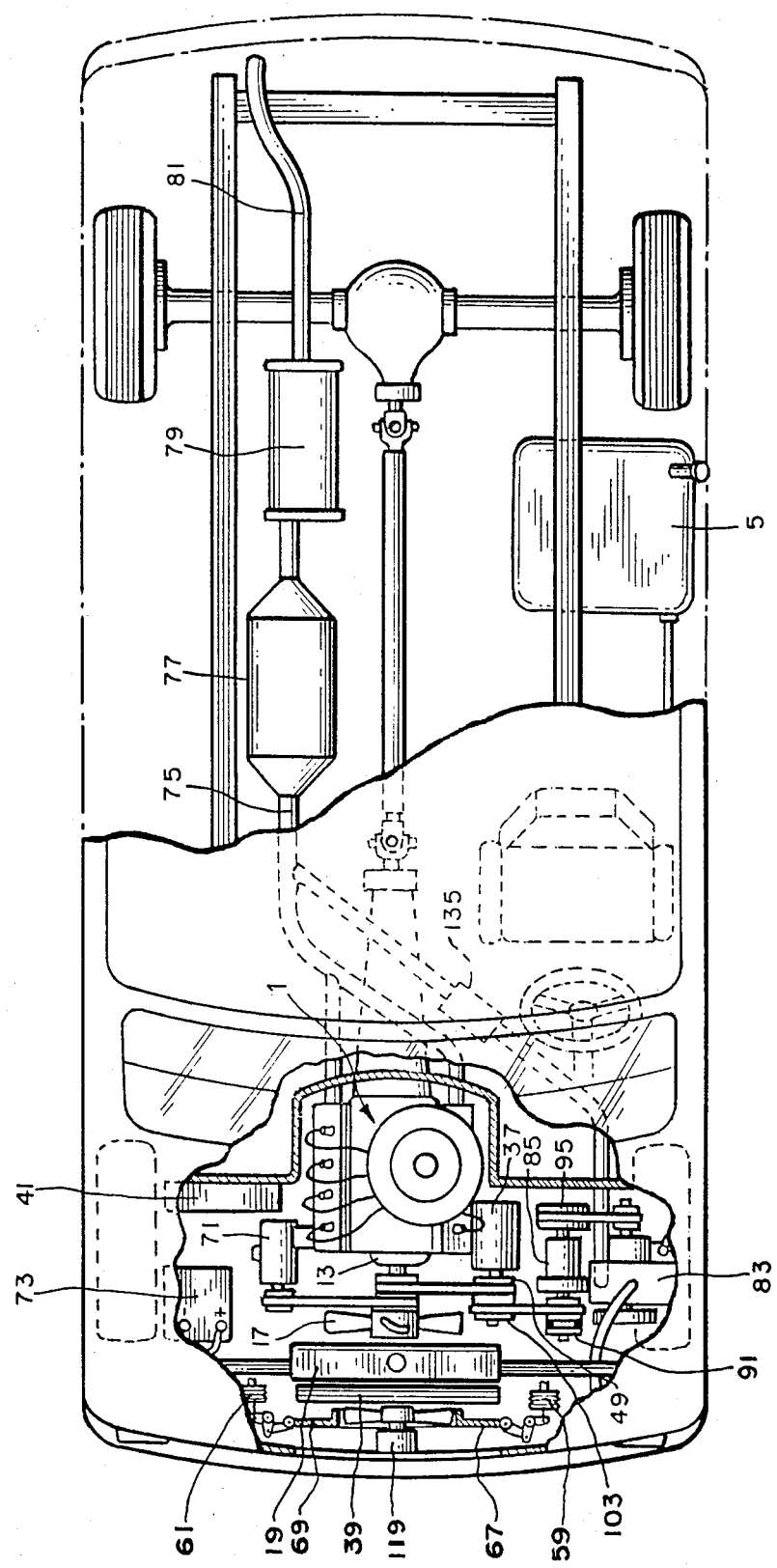
FIG. 2 is a partial cutaway plan view of a van having the auxiliary power system of the invention.

FIG. 2 illustrates a partial cutaway plan view of a van with the auxiliary power system of the invention. As shown in FIG. 2, the exhaust line 134 from the auxiliary engine 83 runs from the engine compartment to connect to the main exhaust line 75 of the vehicle. The exhaust gases of either the main engine or the auxiliary engine are passed through the catalytic converter 77 and main muffler 79 and out through the tail pipe 81.

Figure 3:
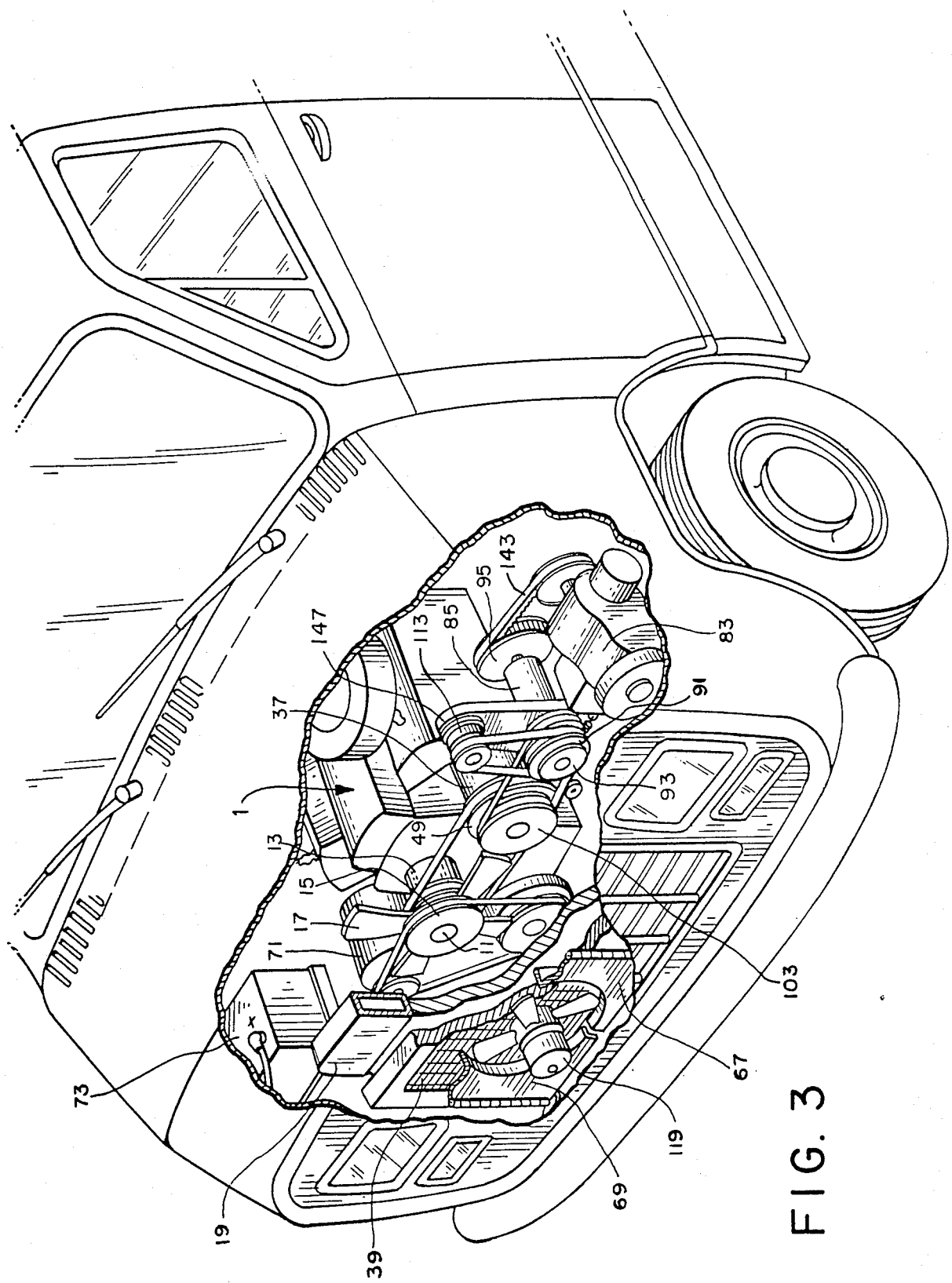
FIG. 3 is a partial cutaway perspective view of the engine compartment of a van having the auxiliary power supply system of the invention.

FIG. 3 illustrates a partial cutaway perspective view of the engine compartment of the van of FIG. 2. It should be understood that, although the system of the invention is shown in a van in FIGS. 2 and 3, the system may be utilizied in other vehicles, such as automobiles, without departing from the spirit of the invention. As shown in FIGS. 2 and 3, the auxiliary engine 83, jack shaft assembly 85 and associated pulleys and belts are conveniently located on one side of the main engine. The components of the auxiliary power system are thus easily fitted within the engine compartment of a van or other vehicle, without disturbing the operational positions of other engine components. Thus, the auxiliary power system of the invention may be easily mounted in existing manufactured vehicles.

FIG. 4 illustrates a plan view in partial section of the connections for the air conditioner compressor 37, the jack shaft assembly 85 and the auxiliary engine 83. In a preferred embodiment of the invention, the power head of a 9.9 hp Honda outboard motor is used as the auxiliary engine 83 of FIG. 4. This four stroke Honda outboard motor is commercially designated as Model No. BF100D and can operate with the same gasoline as is provided for the main engine of a van or automobile. The engine has a water cooling system which can be relatively easily integrated with the cooling system of the vehicle with which the engine is employed. The engine also has a built-in alternator to charge the battery of the vehicle when the engine is running and a capacitive discharge ignition system which is particularly suited to the power assist mode of starting described with respect to FIG. 1.

As shown in FIG. 4, the output shaft 99 of the auxiliary engine is connected to the pulley 97 by means of a key 139 and a bolt 141 which threadingly engages the pulley 97 and the end of the shaft 99.

In a preferred embodiment of the invention, the pulley 97 has a diameter of 3½ inches (8.89 cm) and is rotatively engaged with a 7 inch (17.78 cm) pulley 95 by a Gilmore belt 143.

FIG. 6 illustrates a partial cutaway view of the pulley 95 and an associated gear belt 143, for example as is sold by the Browning Company under the trademark GILMORE. As shown in FIG. 6, the belt 143 has teeth which engage corresponding spaces between associated meshing teeth of the pulley 95. The pulley 97 likewise has teeth which engage the belt 143. The belt 143 and its associated pulleys 95 and 97 are provided to eliminate slippage between the belt and pulleys when the auxiliary engine is started or when the air conditioner compressor cycles and thus varies the torque requirements for the driving engine.

The useable torque curve for the Honda engine 83 is between 1,800 RPM and 3,600 RPM. In a preferred embodiment of the invention, the automatic throttle control will operate the engine at approximately 2,200 RPM. The 2:1 ratio between the pulley 95 and the pulley 97 results in the power transfer shaft 87 being driven at approximately 1,100 RMP. At the output of the shaft 87 the dual pulley 91 has a diameter of approximately 6 inches (15.24 cm) and is connected by a relatively short length of flexible belt 145 to the pulley 103, which has a diameter of approximately 8 inches (20.32 cm). As explained above, the eight-inch pulley 103 is bolted directly to the clutch assembly 51 and the shaft 52 of the air conditioning compressor 37.

The clutch assembly 51 includes an electromagnet 51a which is supported in stationary relation to the shaft 52. A front plate element 51b of the clutch assembly is affixed to the shaft 52 and has several flexible metal fingers 51c affixed about its periphery. In operation, the pulley 14 is supported on bearings to freewheel with respect to the shaft 52 when the electromagnet 51a is de-energized and the fingers 51c are in their disengaged position shown in FIG. 4. When the electromagnet 51a is energized, the fingers 51c are pulled toward the pulley 14 to engage slots in the pulley and to thus cause the pulley to turn with the shaft 52. Thus, when the electromagnetic clutch assembly 51 is energized, the main engine 1 drives the shaft 52 of the air compressor 37. The rotation of the shaft 52 rotates the pulley 103 without regard to the energized or de-energized state of the clutch 51.

The electromagnetic clutch 93 of the jack shaft assembly operates in the above-described manner to cause the dual pulley 91 to rotate with the shaft 87 when the clutch is energized. Thus, when the auxiliary engine is operating, the jack shaft clutch 93 is engaged and the compressor clutch 51 is disengaged so that the pulley 91 drives the pulley 103 and the associated shaft 52 of the compressor. The 3:4 ratio of the pulley 91 to the pulley 103 results in approximately 825 RPM for the shaft 52 of the compressor 37. The 825 RPM is required for optimum operation of the compressor 37.

FIG. 5 illustrates a side elevation view of the jack shaft assembly 85 of FIG. 4. As shown in FIG. 5, the jack shaft assembly 85 is supported within a vehicle engine by a support bracket 147 which also carries the water pump 113 which is driven by the outermost drive portion of the dual pulley 91. The pulley 109 of the water pump 113 has a diameter of approximately 3 inches (7.62 cm). The water pump 113 is thus operated at approximately 550 RPM when the clutch assembly 93 of the jack shaft is engaged. As explained with respect to FIG. 1, the water pump 113 pumps coolant fluid through the auxiliary engine.

Figure 8:
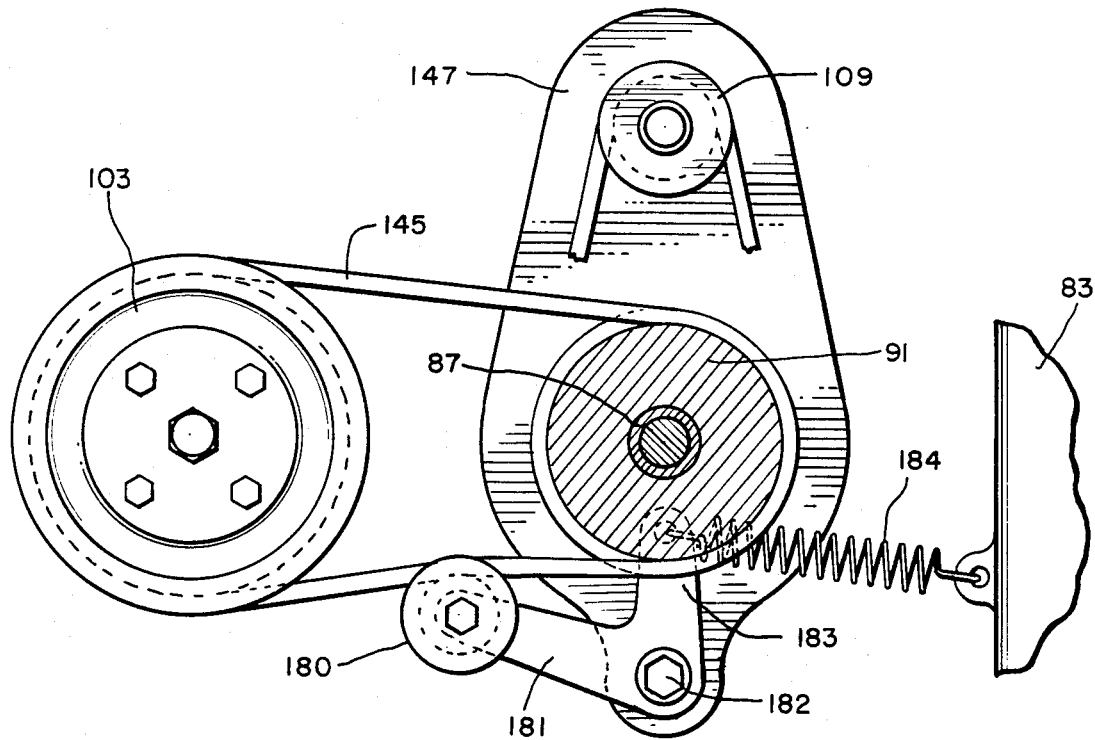
FIG. 8 is a side elevation view of an idler pulley assembly for the jack shaft assembly of FIGS. 4 and 5.

FIG. 8 illustrates a side elevation view of an idler pulley assembly which is provided to ensure that the belt 145 connecting the pulleys 91 and 103 remains engaged with the pulleys despite flexing of the jack shaft assembly and engine in operation. As shown in FIG. 8, an idler pulley 180 is rotatively supported at the end of an arm 181 of an L-bracket which is pivotally affixed to the support bracket 147 by a bolt 182. The opposite end 183 of the L-bracket is biased toward the auxiliary engine 83 by a spring 184. Thus, the idler pulley 180 is pivoted upwardly to maintain tension on the belt 145 and thus ensure quiet and efficient operation of the belt.

A similar idler pulley may also be required for the belt 143 which connects the pulley 97 of the auxiliary engine and the pulley 95 of the power transfer shaft 87. The idler pulley for the belt is not illustrated, because the interlocking engagement of the belt and its pulleys may be sufficient to ensure proper operation of the belt despite flexing and vibration of the jack shaft assembly.

Figure 7A:
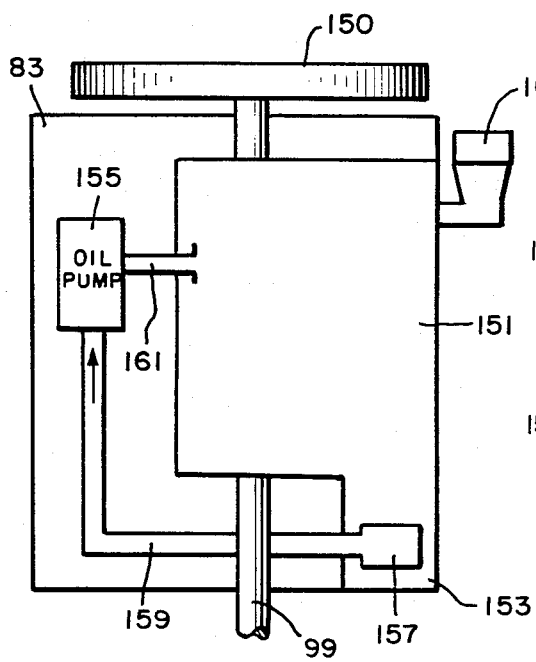
FIG. 7A is a diagrammatic illustration of a vertically oriented marine outboard motor.

FIG. 7A is a diagrammatic illustration of the Honda outboard engine 83 operating in the vertical orientation for which it was designed. As shown in FIG. 7A, the engine includes the float-bowl carburetor 107, a crankcase 151 with an oil reservoir 153 and an oil pump 155 which circulates oil from the oil reservoir and into the crankcase for lubrication of the engine. In operation, oil is passed through a filter 157 and along a line 159 to the oil pump 155 and is then pumped through a line 161 into an input port of the crankcase.

Figure 7B:
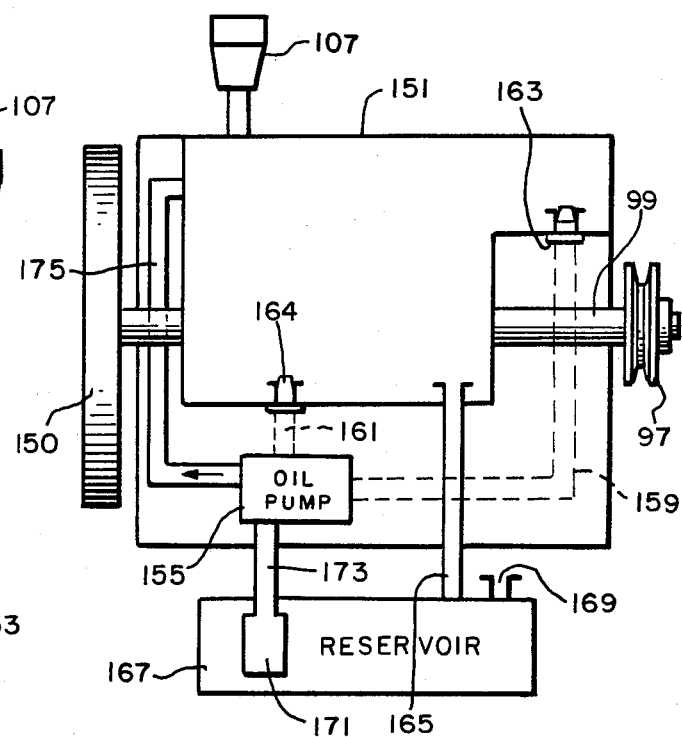
FIG. 7B is a diagrammatic illustration of the marine outboard motor of FIG. 7A, modified to operate in a horizontal orientation in the auxiliary power system of the invention.

When the outboard engine of FIG. 7A is used in the system of the invention, it must operate with a horizontal orientation, for example as illustrated diagrammatically at FIG. 7B. In order to allow the engine to operate in this horizontal orientation, the oil flow within the engine must be modified to provide a proper circulation of lubricating oil within the crankcase 151. Also, the carburetor 107 must be reoriented so that it can operate with its float-bowl system.

As shown in FIG. 7B, the oil flow lines 159 and 161 illustrated in FIG. 7A are shut off, for example by plugs 163 and 164, and new flow lines 165 and 175 are provided to allow oil to circulate through the engine from an external oil reservoir 167. The reservoir 167 has an outlet 169 which allows pressure equalization within the reservoir. A filter 171 is connected through a line 173 to an input port of the oil pump 155 and the line 175 connects the output port of the pump to a new oil input port of the crankcase 151. Thus, the oil flow paths into and out of the crankcase are altered to provide appropriate lubrication for the mechanism of the engine when the flywheel 150 and drive shaft 99 are positioned in the indicated horizontal orientation.

It should be understood that the specified Honda engine was employed in the apparatus of the invention because it is commercially available and can be modified to achieve the objects of the invention. However, it should be understood that the system of the invention is not limited to this particular engine or to the particular modifications indicated for the engine. Thus, for example, outboard engines of other manufacture or engines particularly designed to achieve the indicated desired results can be used, without departing from the spirit of the invention.

Thus, the invention may be embodied in other specific forms without departing from its spirit or essential characteristics. The present described embodiments are therefore to be considered in all respects as illustrative and not restrictive. The scope of the invention is indicated by the claims rather than by the foregoing description and, accordingly, all changes which come within the meaning and range of the equivalents of the claims are intended to be embraced therein.

I claim:

1. An integrated main and auxiliary power system for a vehicle, comprising:
    an engine compartment;
    a main internal combustion engine disposed in said compartment for moving said vehicle;
    air conditioning means including a compressor means disposed in said compartment for cooling the interior of said vehicle;
    means disposed in said compartment for selectively connecting said main engine to said compressor means for driving the air conditioning means;
    an auxiliary internal combustion engine disposed in said compartment for selectively operating said compressor means when said main engine is turned off;
    shaft assembly means disposed in said compartment for coupling said auxiliary engine to selectively operate said compressor means;
    a fuel tank for supplying fuel to the main and auxiliary engines;
    a radiator disposed in said compartment adjacent to said main engine in fluid communication with the main engine for circulating coolant fluid to cool the main engine when the engine is operating;
    means disposed in said compartment for connecting said auxiliary engine in fluid communication with said radiator for circulating coolant fluid to cool the auxiliary engine when the auxiliary engine is operating;
    an exhaust pipe connected to said main engine for expelling exhaust gases emitted when the engine is operating; and
    connector means for connecting said auxiliary engine to said exhaust pipe for expelling exhaust gases emitted when the auxiliary engine is operating.

2. The integrated power system of claim 1, further including a gear belt having teeth for rotatively coupling said shaft assembly means to said compressor means to reduce belt slippage and noise when the auxiliary engine operates said compressor means.

3. The integrated power system of claim 1, wherein said connector means includes a baffle plate for directing the flow of exhaust gases generated when one of said engines is operating to substantially avoid movement of the gases into the nonoperating engine.

4. The integrated power system of claim 1, wherein said air conditioning means includes a condenser and an auxiliary fan means for supplying a flow of air to cool the condenser and radiator when the main engine is not operating, the auxiliary fan means including shroud doors for automatically closing to direct a flow of cooling air from the auxiliary fan means to said condenser and radiator when the main engine is not operating and for automatically opening to allow a flow of cooling air to bypass the auxiliary fan means and to cool the condenser and radiator when the main engine is operating.

5. The integrated power system of claim 4, wherein said auxiliary fan means includes at least one vacuum actuated bellows connected to said shroud doors and biased to close the doors when the main engine is not operating, said bellows being responsive to a vacuum produced by the operating main engine to hold open said shroud doors.

6. The integrated power system of claim 1, including a liquid storage tank and means for selectively circulating said coolant fluid from the auxiliary engine to heat liquid in said tank when the auxiliary engine is operating.

7. The integrated power system of claim 1, including at least one heater means and means for selectively circulating said coolant fluid from the auxiliary engine to cause the heater means to heat at least a portion of the interior of said vehicle when the auxiliary engine is operating.

8. The integrated power system of claim 1, wherein said auxiliary engine includes an exhaust port for emitting exhaust gases when the auxiliary engine is operating and said connector means includes a connector pipe for connecting said exhaust port to said exhaust pipe of said main engine, said connector pipe including a baffle plate disposed at the point of connection of the connector pipe with the exhaust pipe, the baffle plate positioned for directing and expelling exhaust gases of the main engine from the exhaust pipe and for preventing the main engine exhaust gases from moving into the auxiliary engine when the auxiliary engine is not operating.

9. The integrated power system of claim 1, further including:
    main clutch means for selectively connecting said main engine to drive said compressor means;
    said shaft assembly means rotatively connected at one end to be driven by said auxiliary engine and rotatively connected at an opposite end to drive said compressor means, the shaft assembly means having auxiliary clutch means for selectively applying rotary power from the auxiliary engine to drive the compressor means, the shaft assembly means having means for translating a predetermined operating RPM output of said auxiliary engine to a different predetermined operating RPM input for the compressor means.

10. The integrated power system of claim 9, wherein said shaft assembly means includes means for translating said predetermined operating RPM output of the auxiliary engine to a lower predetermined operating RPM input for the compressor means.

11. The integrated power control system of claim 9, further including a water pump and means for rotatively connecting the pump to an end of said shaft assembly means, said water pump driven by the shaft assembly means to circulate said coolant fluid through the auxiliary engine.

12. The integrated power system of claim 1, wherein said auxiliary engine includes a carburetor with a throttle for metering fuel to the engine and throttle control means connected to said throttle for automatically adjusting the RPM output of the auxiliary engine to a preselected value.

13. The integrated power system of claim 12, wherein said throttle control means includes a vacuum-actuated bellows connected to control said throttle, spring means for biasing the bellows in one direction and means for connecting the bellows to a vacuum provided by the operating auxiliary engine to bias the bellows in an opposite direction, the bellows operating to position the throttle at a preselected operational position for maintaining a relatively constant RPM output of the auxiliary engine when the force of the vacuum balances the opposite spring force of the spring means.

14. The integrated power system of claim 1, wherein said auxiliary engine is a marine outboard motor.

15. The integrated power system of claim 14, wherein said outboard motor includes a drive shaft and means for circulating a lubricant within the motor to allow operation of the motor with the drive shaft in a horizontal orientation.

16. The integrated power system of claim 1, including a temperature sensing means for sensing the temperature of said coolant fluid leaving said auxiliary engine and for turning off the engine if the sensed temperature exceeds a predetermined temperature.

17. An integrated main and auxiliary power system for the air conditioner of a vehicle, comprising:
 an engine compartment of the vehicle;
 an air conditioner for cooling the interior of the vehicle;
 a main engine disposed in said compartment for moving the vehicle and for selectively powering the air conditioner;
 a radiator means disposed in said compartment and having fluid connections with said main engine for circulating coolant fluid to cool the engine and thereby maintaining its temperature within a predetermined operating temperature range;
 an exhaust means for directing and expelling exhaust gases emitted by the operating main engine;
 an auxiliary internal combustion engine disposed in said compartment for selectively powering said air conditioner when said main engine is not operating;
 a jack shaft assembly means disposed in said compartment for coupling said auxiliary engine to selectively operate said air conditioner;
 a fuel tank for selectively supplying fuel to both the main engine and the auxiliary internal combustion engine;
 a connector means between said auxiliary engine and said radiator for circulating said coolant fluid to cool the operating auxiliary engine; and
 an auxiliary connector means between said auxiliary engine and said exhaust means for directing and expelling exhaust gases emitted by the operating auxiliary engine.

18. The integrated power system of claim 17, wherein said auxiliary connector means includes a baffle plate for preventing exhaust gases of said main engine from moving into said auxiliary engine when the auxiliary engine is not operating.

19. An integrated main and auxiliary power system for the air conditioner and heater of a vehicle, comprising:
 an engine compartment within the vehicle;
 an air conditioner for cooling the interior of the vehicle;
 a heater for heating the interior of the vehicle;
 a main engine disposed in said compartment for moving the vehicle and for selectively powering the air conditioner;
 a radiator means disposed in said compartment and having fluid connections with said main engine for circulating coolant fluid to cool the engine and thereby maintain its temperature within a predetermined operating temperature range;
 an exhaust means for directing and expelling exhaust gases emitted by the operating main engine;
 an auxiliary internal combustion engine disposed in said compartment for selectively powering said air conditioner when said main engine is not operating;
 a fuel tank for selectively supplying fuel to both the main engine and the auxiliary internal combustion engine;
 a connector means between said auxiliary engine and said radiator means for circulating said coolant fluid to cool the operating auxiliary engine;
 valve means for selectively circulating coolant fluid from either the main engine or the auxiliary engine to heat the heater; and
 an auxiliary connector means between said auxiliary engine and said exhaust means for directing and expelling exhaust gases emitted by the operating auxiliary engine and for preventing exhaust gases of the operating main engine from moving into the auxiliary engine when the auxiliary engine is not operating.

20. The integrated power system of claim 19, including a tank for storing a liquid, said valve means having means for selectively circulating said coolant fluid from the main engine or the auxiliary engine to heat the liquid in said tank.

* * * * *

UNITED STATES PATENT AND TRADEMARK OFFICE
CERTIFICATE OF CORRECTION

PATENT NO. : 4,531,379
DATED : July 30, 1985
INVENTOR(S) : Robert E. Diefenthaler, Jr.

It is certified that error appears in the above-identified patent and that said Letters Patent is hereby corrected as shown below:

In the specification, column 5, line 52, delete "freon" and insert --Freon-- therefor;

column 6, line 21, delete "an" and insert --and-- therefor;

column 6, line 64, delete "89" and insert --99-- therefor;

column 7, line 3, delete "53" and insert --93-- therefor;

column 9, line 54, delete "RMP" and insert --RPM-- therefor.

Signed and Sealed this

Tenth Day of February, 1987

Attest:

DONALD J. QUIGG

*Attesting Officer*  *Commissioner of Patents and Trademarks*